United States Patent
Gruber

(10) Patent No.: US 9,004,825 B2
(45) Date of Patent: Apr. 14, 2015

(54) MULTIPLE EDGE DRILL

(75) Inventor: Jochen Gruber, Sigmaringen (DE)

(73) Assignee: Guehring OHG, Albstadt (DE)

( * ) Notice: Subject to any disclaimer, the term of this patent is extended or adjusted under 35 U.S.C. 154(b) by 1142 days.

(21) Appl. No.: 12/979,594

(22) Filed: Dec. 28, 2010

(65) Prior Publication Data

US 2011/0200403 A1    Aug. 18, 2011

Related U.S. Application Data

(63) Continuation of application No. PCT/DE2009/000892, filed on Jun. 26, 2009.

(30) Foreign Application Priority Data

Jun. 28, 2008  (DE) .......................... 10 2008 030 796
Jun. 10, 2009  (DE) .......................... 10 2009 024 597

(51) Int. Cl.
*B23B 51/02* (2006.01)

(52) U.S. Cl.
CPC ............ *B23B 51/02* (2013.01); *B23B 2251/18* (2013.01); *B23B 2222/14* (2013.01); *B23B 2222/84* (2013.01); *B23B 2251/04* (2013.01); *B23B 2251/085* (2013.01); *B23B 2251/14* (2013.01)

(58) Field of Classification Search
CPC .. B23B 51/009; B23B 51/02; B23B 2251/18; B23B 2251/285
USPC .......................... 408/1 R, 223–225, 227, 230
IPC .......................................... B23B 51/00, 51/02
See application file for complete search history.

(56) References Cited

U.S. PATENT DOCUMENTS

| | | | |
|---|---|---|---|
| 1,309,706 A | | 7/1919 | Taylor |
| 3,443,459 A | | 5/1969 | Mackey et al. |
| 4,116,580 A | | 9/1978 | Hall et al. |
| 5,173,014 A | * | 12/1992 | Agapiou et al. ................ 408/59 |
| 5,558,475 A | | 9/1996 | Hakansson et al. |
| 6,126,367 A | * | 10/2000 | Reed ............................. 408/1 R |
| 6,132,149 A | * | 10/2000 | Howarth et al. ............. 408/230 |
| 6,283,682 B1 | * | 9/2001 | Plummer ........................ 408/57 |

(Continued)

FOREIGN PATENT DOCUMENTS

| | | |
|---|---|---|
| DE | 29919858 | 4/2000 |
| DE | 20307258 | 9/2004 |

(Continued)

OTHER PUBLICATIONS

Machine translation of JP 2005-153023, printed May 2014.*

(Continued)

*Primary Examiner* — Daniel Howell
(74) *Attorney, Agent, or Firm* — Burr & Brown, PLLC

(57) ABSTRACT

The invention relates to a multiple edge drill such as is especially used for machining difficult-to-machine, e.g. high-toughness materials, such as e.g. cast steel, steel for hardening and tempering or other difficult-to-machine steel materials including metallic cast materials, such as e.g. gray cast iron, and especially GGV or ADI cast iron. The facet is designed in such a manner that the main cutting edge has at least two main cutting edge sections that define point angles of different size, the radially outer point angle being smaller than the radially inner one, thereby obtaining a good cutting behavior and long service life of the tool.

18 Claims, 5 Drawing Sheets

(56) References Cited

U.S. PATENT DOCUMENTS

| | | | |
|---|---|---|---|
| 6,315,504 B1 * | 11/2001 | Sekiguchi et al. | 408/144 |
| 6,443,674 B1 * | 9/2002 | Jaconi | 408/1 R |
| 7,296,954 B2 | 11/2007 | Haenle | |
| 7,367,758 B2 * | 5/2008 | Turrini et al. | 408/230 |
| 7,371,035 B2 * | 5/2008 | Mast et al. | 408/230 |
| 7,575,401 B1 * | 8/2009 | Garrick et al. | 408/145 |
| 8,105,001 B2 * | 1/2012 | Krenzer et al. | 408/230 |
| 2003/0202853 A1 * | 10/2003 | Ko et al. | 408/225 |
| 2006/0056929 A1 | 3/2006 | Haenle | |
| 2006/0269372 A1 * | 11/2006 | Goshima | 408/230 |

FOREIGN PATENT DOCUMENTS

| | | |
|---|---|---|
| EP | 0 591 122 A1 | 4/1994 |
| EP | 1 622 735 B1 | 2/2006 |
| GB | 2184046 A * | 6/1987 |
| JP | 07080714 A * | 3/1995 |
| JP | 08071824 A * | 3/1996 |
| JP | 09277109 A * | 10/1997 |
| JP | 2005153023 A * | 6/2005 |

OTHER PUBLICATIONS

Machine translation of JP 07-080714, printed May 2014.*

* cited by examiner

MULTIPLE EDGE DRILL

The invention relates to a multiple edge drill, in particular a drill for processing very tough materials, which are therefore difficult to machine, such as cast steel, quenched and tempered steel, and other steel materials which are difficult to machine, including cast materials, more precisely metal cast materials, such as cast iron, and in particular GGV (cast iron with vermicular graphite) or ADI cast iron.

The development of materials, including metal cast materials, has been characterized in recent years in that higher and higher strengths are achieved with simultaneously increased toughness. In the field of metal cast materials, in addition to the classically used spheroidal graphite iron (GGG), cast iron with vermicular graphite (GGV) is increasingly used. However, austempered ductile iron (ADI), having even higher strength and toughness values, is also used ever more frequently.

Such materials can only be processed cost-effectively if the geometry and material of the tool are adapted to the machining task in such a manner that sufficient service lives result. The tool is subject to comparatively high abrasive wear during the machining of the materials cited at the beginning. This is also true for the machining of cast iron microstructure, which is additionally frequently constructed irregularly, i.e., in which hard phases (such as ferrite, perlite, or martensite) occur in addition to soft carbon inclusions. Because of the inhomogeneous microstructure, it is additionally to be ensured that the tool does not lose its processing precision as a result of the occurring vibrations.

In order to meet the requirements with respect to high hardness and wear resistance, on the one hand, and with respect to toughness and vibration stress carrying capacity, on the other hand, drills for processing materials which are difficult to machine, including cast materials, made of solid carbide of class K30 to K40 according to classification ISO 513 have already been used. In order to still increase the machining performance, i.e., the achievable cutting speeds and advances, ultrafine grain carbides having grain sizes of the WC crystals less than 0.8 μm have even been used.

In the older Patent Specification EP 1 622 735 B1 of the applicant, a drill of the type described at the beginning is disclosed, in which the main cutting edge runs continuously convexly curved at a radius in the axial direction originating from the cutting edge corner. In this way, the main cutting edge is lengthened, whereby the pressure which loads the cutting edge is reduced somewhat. Similar approaches are shown in the documents U.S. Pat. No. 3,443,459, EP 0591 122 A1, U.S. Pat. No. 4,116,580, and U.S. Pat. No. 1,309,706.

It is proposed in the prior art according to EP 1 622 735 B1 that to improve the cost-effectiveness of the production method of a drill according to the species, which is distinguished by particularly good service life and processing precision, that the flank surfaces be formed as faceted, i.e., divided like a four-facet point. However, a certain restriction with respect to the kinematics which are used during the grinding of the tool results simultaneously in this way. Using modern CNC machines, the convex main cutting edge may be produced extraordinarily exactly having the required point symmetry of the main cutting blade to the drill axis. However, all users are not equipped with sufficiently complex machine tools, so that resharpening of these known tools at the user often meets with difficulties.

The invention is therefore based on the object of refining a multiple edge drill of the type described at the beginning in such a way that it is suitable in particular for processing very tough materials, such as cast steel, quenched and tempered steel, and other steel materials which are difficult to machine, including cast materials, more precisely metal cast materials, such as cast iron, and in particular GGV or ADI cast iron and is more easily producible while maintaining extremely high service life and great processing precision, i.e., with little tendency to vibrate, and may be resharpened as often as desired.

This object is achieved by the features of claim 1.

According to the invention, the main cutting edge experiences a redesign in such a manner that it defines two different tip angles of the drill. The outer and the inner main cutting edge sections may thus be produced individually by a simplified point, i.e., using simplified grinding kinematics. The design according to the invention opens up the possibility of producing the point exclusively by flat surfaces, i.e., by flat flank surfaces and optionally by flat tapering surfaces, whereby it is particularly made easier to resharpen the tool without losses of the centering capability, on simpler machines. The main cutting edge, which is provided with the buckle, still has the advantage that the load per unit of length of the main cutting edge remains comparatively small.

In addition, the material is saved by the design according to the invention, since the comparatively large tip angle in the center substantially shortens the distance from the drill tip to the cutting edge corner. The drill according to the invention is therefore suitable in particular for the embodiment as a carbide drill, in which either the entire drill or at least those areas which form the most highly loaded cutting edge areas, are implemented from a carbide, such as solid carbide, cermet, cutting ceramics, etc. The drill according to the invention can also be implemented in such a way that the areas of the drill which primarily participate in the chip formation are formed by cutting edge inserts or a single cutting edge insert.

Extensive experiments using different drill tip geometries have shown that particularly good service lives of the tool may be achieved if the radial outer main cutting edge section (24) defines a tip angle (WSPA) in the range between 95 and 130°, preferably in the range between 115 and 125°, and the radial inner main cutting edge section (22) defines a tip angle (WSPI) in the range between 130 and 150°, preferably approximately 140°. Using this geometry, it is possible to minimize the wear on the cutting corner, on the rake surface, and on the flank surface. For machining extremely tough materials, such as quenched and tempered steel (e.g., 42CrMo4), a tip angle (WSPA) for the radial outer main cutting edge section (24) close to the upper limit (125°) has proven to be particularly advantageous. The radial forces acting on the cutting edge may be controlled better with such geometries, which has a positive effect on the service life of the tool during the machining of particularly tough materials. A value of 100° for the tip angle (WSPA) of the radial outer main cutting edge section (24) can already ensure good results for the machining of steel cast materials. In comparison to a double-angle point according to DIN 1412 Form D, a significant shortening of the axial distance already results here between the drill tip and the cutting edge corner. Not only is material saved in this way, for example, material for a possibly used carbide, but rather it is simultaneously also ensured that the decisive points of the drill tip, i.e., the center and the cutting edge corner, may be supplied particularly effectively with coolant/lubricant. This supply is particularly improved if the tool is equipped with internal coolant/lubricant ducts.

Advantageous embodiments are the subject matter of the subclaims.

With the refinement by claim 2, the greatest possible lengthening of the main cutting edge outside the drill core results, whereby the load peaks of the cutting edge may be effectively reduced. Using this design, the main cutting edge sections running at a differently sized angle to the axis of the drill outside the drill core are approximately of equal size, whereby the load of the cutting edge may be evened out.

If the radial inner main cutting edge section runs at an angle in the axial direction toward the drill center viewed from the drill tip, the chip formation in the center of the drill is positively influenced, which allows the cutting forces to be controlled better even in the case of metal materials which are very difficult to machine, including cast materials, and allows the tendency of the tool to vibrate to be reduced.

A further perceptible reduction of wear on the main cutting edge, on the flank surface, and on the rake surface can be ensured by the refinement of claim 4.

If, according to claim 5, a taper like a split point is provided, a further simplification of the point geometry results. In other words, the entire point of the drill may be defined using flat surfaces, so that exclusively linear movements of the grinding tools, which are also simplified in profile, are required. This provides the requirement that the point precision can also be improved even in the case of simpler design of the machine tool. It is possible in this way to implement the cutting edges exactly symmetrically and to restrict the chisel edge to a minimum in proximity to the drill center, so that a drill having outstanding centering capability results.

Because the kinematics during the grinding of the drill are simplified, carbides which are very difficult to machine may also be used cost-effectively for the drill, without encountering the danger of creating impermissible deviations from the theoretical point geometry during the processing of the carbide, i.e., during the production of the point.

With the refinement of claim 6, an optimally oriented wedge angle can be formed in the area of each main cutting edge section, so that cutting behavior may be created viewed over the entire cutting edge which results in further improved evening out of the strain of the material. Spot overstresses of the drill are prevented in this way, so that the service life of the tool is improved overall.

Through the embodiment of the main flank surfaces according to claim 7, the condition is provided so that additional free space is provided for the coolant/lubricant in the case of internal coolant/lubricant supply, which substantially improves the access of the coolant/lubricant to the main cutting edge including the main cutting edge section located in the drill core. This measure is particularly advantageous in particular if the tool is operated using so-called minimal quantity lubrication (MQL) technology, in which compressed air under high pressure and admixed with ultrafine lubricant droplets, i.e., an aerosol, is essentially conducted through the internal cooling ducts and exits from the main flank surfaces, hits the cutting edges, and is removed together with the chips through the flute.

The design of the main cutting edge is variable in wide boundaries to perform an adaptation to the individually provided microstructure of the material to be machined. However, it has been shown that it is advantageous for the machining of particularly tough and high-strength cast materials to design at least the radial outer main cutting edge section as convex upon observation of the tool in the axial direction.

For the machining of tools having a particularly tough microstructure, for example, of quenched and tempered steel types, the refinement of claim 9 is particularly advantageous. It was possible to show on the basis of experiments that the cutting edge wear is further perceptibly reduced by this design.

An improvement of the cooling or lubrication of the sections of the drill participating in the chip formation results with the refinement of claim 10.

The coolant/lubricant fluid exiting from the internal coolant/lubricant ducts may be conducted on demand and in a targeted manner to the points which are subject to particularly high wear during the machining via a neck according to claim 11.

If the drill is implemented having a chamfer in the area of the cutting edge corner (134) according to claim 12, whose extension (ER) in the radial direction is in the range between 0.05 and 0.07×D and whose extension in the peripheral direction EU is in the range between 0.025 and 0.035×D, D designating the nominal diameter of the drill (10), the cutting edge corner wear may be reduced once again, without negatively influencing the chip formation. The concrete geometry for the chamfer is selected as a function of the material.

A large amount of leeway is given for the design of the cutting edge part of the drill. The tool can be implemented as a linearly fluted tool. It can even be implemented as a spiral fluted tool because of the particularly high machining force of the tool and the particularly good cutting edge stability.

All common tool steels come into consideration as the material for the tool according to the invention, in particular high-speed steels such as HSS, HSS-E, HSS-PM, HSS-E-PM, HS6-5-2, HS6-5-3, HS6-5-2-5, HS10-4-3-10, HS2-9-2, or HS2-9-1-8. However, carbides may also advantageously be used for the drill as a whole or for those sections of the drill which primarily participate in the chip formation. Fundamentally, all common and particularly high-strength carbides may be used, for example, those which were described in older European Patent Specification 1 622 735 B1 of the applicant. The content of this document is hereby expressly incorporated in the content of the disclosure of this application. If the tool comprises carbide in its entirety, for example, solid carbide (SC), a particularly high stability results, which leads to the containment of vibrations and therefore increased processing precision.

Of course, it is also possible to provide the drill according to the invention with a suitable coating in those areas which are subject to particular strains, which can comprise both a soft coat and also a hard coat. In this context, for example, coatings can be used as are sold by the applicant under the designations "A coat", "Super A coat", "C coat", "F coat", "P coat", "S coat", or "M coat".

Further advantageous embodiments are the subject matter of the remaining subclaims.

An exemplary embodiment of the invention is explained in greater detail hereafter on the basis of schematic drawings. In the figures.

Figure 1:
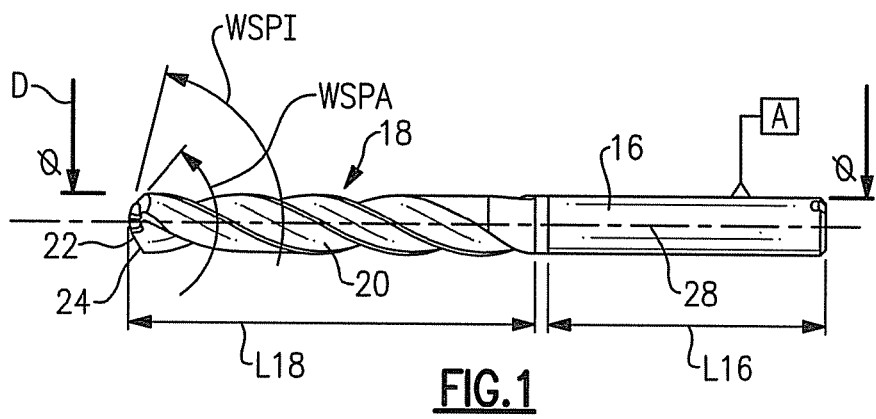
FIG. 1 shows a side view of an embodiment of the multipart drill.

In FIGS. 1 to 8, a drill, more precisely a two-edge drill, is shown by the reference numeral 10, which is suitable in particular for processing very tough materials such as cast steel, quenched and tempered steel, and other steel materials which are difficult to machine, including metal cast materials, such as cast iron, and in particular GGV (cast iron with vermicular graphite) or ADI cast iron, as are used in particular in engine construction under the designation GGV or ADI. The tool according to FIGS. 1 to 8 is particularly optimized with respect to the processing of cast materials.

The drill is described hereafter as a two-edge tool. However, it is to be emphasized already at this point that it can also form more than two cutting edges, of course. Furthermore, the tool is described as a tool which is produced as a whole from a single material, preferably a high-speed steel or a carbide. However, it is also to be emphasized that the drill can also be assembled from multiple components, of course, for example, the shank being able to comprise a tool steel (e.g., high-speed steel), and only those sections which are subject to particularly high strains during the machining being formed by carbide inserts.

All typical carbides, which have been regularly used up to this point for high-performance machining tools, i.e., in particular solid carbide, cermet materials, or ceramic-based materials, may be used as the carbide materials.

Although it is not shown in greater detail in the illustration according to FIG. 1, the tool 10 is equipped with internal cooling ducts 12, whose discharge openings 14 are recognizable in the frontal views.

The drill has a shank 16 and a cutting edge part 18, in which two spiral flutes 20 are formed. The drawing shows, for example, a drill having a nominal diameter of approximately 8 mm. The length L18 of the cutting edge part 18 is approximately 50 mm in this case. The length L16 of the shank 16 is approximately 35 mm, for example.

The drill according to the invention is distinguished by a special design of the drill tip, which is ground in such a way that the main cutting edge has at least two cutting edge sections 22 and 24, which each define different tip angles WSPI and WSPA. Specifically (see FIGS. 1 and 5), the radial inner main cutting edge section 22 defines the tip angle WSPI, which is preferably in the range between 130 and 150°, particularly preferably approximately 140°. In contrast, the radial outer main cutting edge section 24 establishes a tip angle WSPA, which is substantially smaller than the angle WSPI and is preferably in the range between 95 and 115°, more preferably approximately 100° to 110°. Details of the point are explained in greater detail hereafter on the basis of FIGS. 2 to 8.

Figure 3:
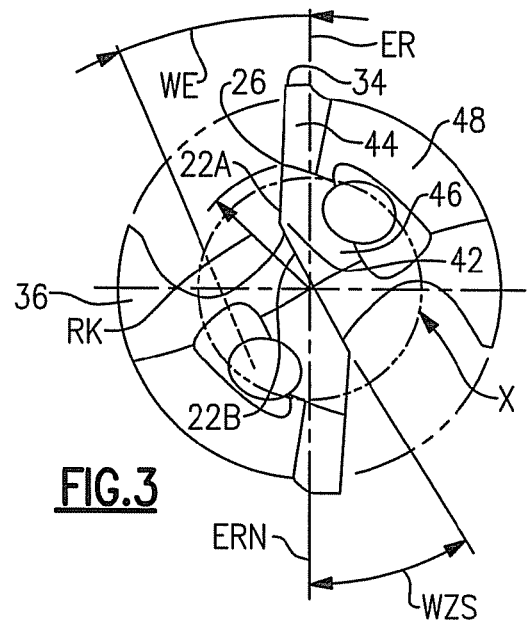
FIG. 3 shows a greatly enlarged view of the illustration according to FIG. 2.

It may be seen from the illustration, in particular the illustration according to FIG. 3, that the main cutting edge sections 22 and 24 have an approximately equal radial extension. In other words, a buckle point 26 of the main cutting edge 22, 24 has a distance RK from the axis 28 of the drill 10, which essentially corresponds to one-third of the nominal diameter D (see FIG. 1) of the drill. This distance RK is advantageously selected so that it is in the range from 0.25×D and 0.4×D, preferably between 0.30 and 0.35×D, D designating the nominal diameter of the drill.

As is also obvious from the figures, the drill core of the drill is equipped with a taper 30 like a split point according to DIN 1412 Form C, so that the radial inner main cutting edge section 22 is divided into two areas 22A and 22B. The area 22B runs at an angle to the area 22A toward the center, i.e., toward the axis 28 of the drill 10. The angle designated in the illustration according to FIG. 3 between the cutting edge area 22B and a plane ERN running through the drill axis 28, which leads to the rear edge of the secondary cutting edge, is between 20 and 25°.

Figure 4:
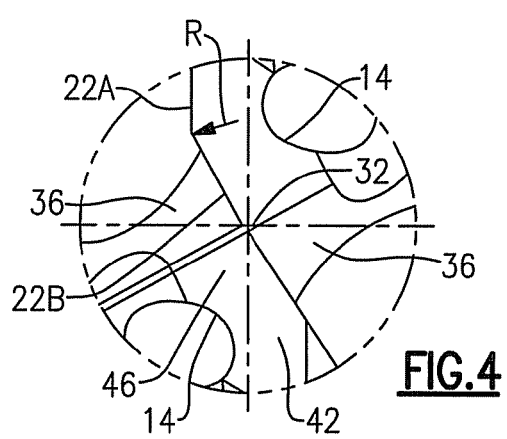
FIG. 4 shows detail IV in FIG. 3.

As shown best in FIG. 4, the chisel edge 32 is reduced to a minimal length of, for example, a few one hundredths of a millimeter by the taper 30. The drill accordingly executes a cutting movement from the cutting edge corner 34 up to close to the drill center 28, whereby the advance forces of the drill may be decreased.

As results from FIG. 4, the transition between the sections 22B and 22A of the main cutting edge section 22 is rounded, over a radius R which is in the range between 0.15 and 0.30, preferably between 0.20 and 0.26×D. In other words, the radius R is comparatively large, which has proven to be advantageous to prevent excessive strain at the transition point between the areas 22A and 22B.

Figure 8:
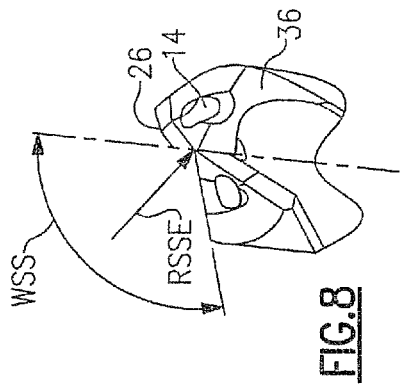
FIG. 8 shows a perspective view of the tool in the scale of FIGS. 2 and 5 to 7 in a viewing direction along an axis which runs parallel to a tapering surface, on the one hand, and to a plane which contains a main cutting edge center section.
Figure 6:
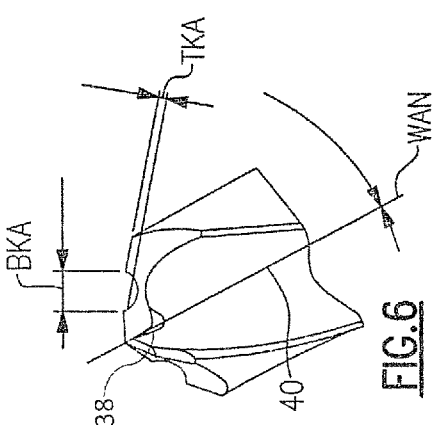
FIG. 6 shows a view of the drill in a viewing direction along arrow "VI" in FIG. 2.
Figure 5:
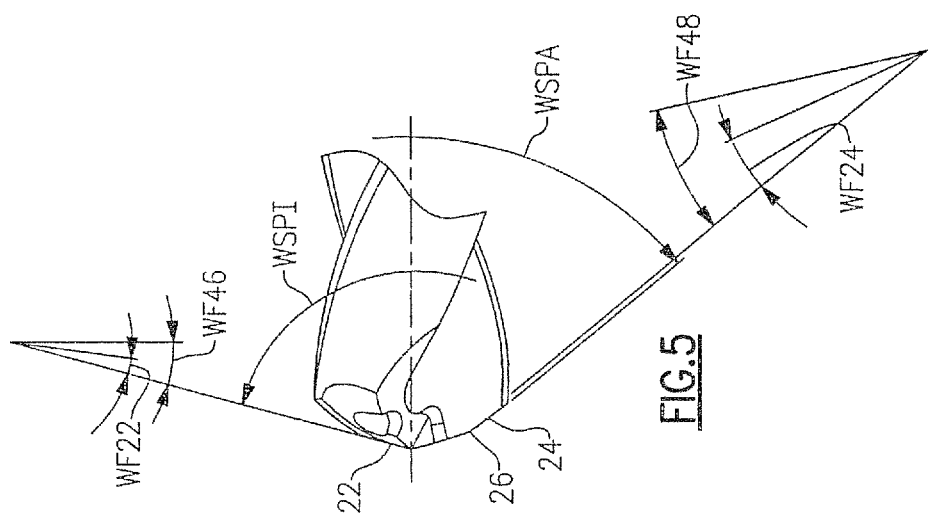
FIG. 5 shows a view of the drill in a viewing direction along arrow "V" in FIG. 2.

The taper 30 is advantageously produced by a grinding disc which is preferably moved linearly in a direction which is perpendicular to the plane of the illustration of FIG. 8 for the grinding procedure. The cross-sectional profile of the grinding disc is correspondingly also obvious from this figure, i.e., it may be seen that the surfaces of the grinding disc which execute the grinding process enclose an angle WSS of approximately 105°. Of course, the grinding disc is not equipped with a sharp edge between the surfaces. Rather, this edge is rounded, the radius RSSE being able to be 0.2 mm, for example.

Therefore, a taper surface 36 arises, on the one hand, and a cutting edge front face 38 in the drill core adjoining thereon at an angle, on the other hand, arise with the grinding disc producing the taper 30. The cutting edge front face 38—as can be seen best from FIG. 6—is pitched either parallel or at an angle WAN of up to −2° to a radial plane 40 of the drill, i.e., it forms a negative chip angle.

Figure 7:
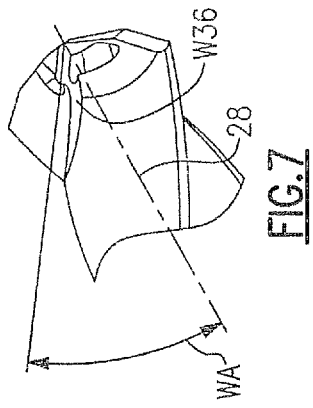
FIG. 7 shows a view of the drill in a viewing direction along arrow "VII" in FIG. 2.

It can be inferred from FIG. 7 that the taper surface 36 is placed comparatively steeply to the drill axis 28. The pitch angle WA is preferably in the range between 33° and 38°.

The point of the drill according to the invention is additionally made so that separate main flank surfaces 42, 44 are assigned to the two main cutting edge sections 22 and 24. The main flank surfaces 42, 44 are preferably formed by flat surfaces, however, they may also be formed by curved surfaces, for example, conical or spherical lateral surfaces. It is obvious from FIG. 5 that the clearance angle WF22 is kept at approximately the same size as the clearance angle WF24 of the radial outer main cutting edge section 24. For example, the clearance angle is approximately 8°.

Figure 2:
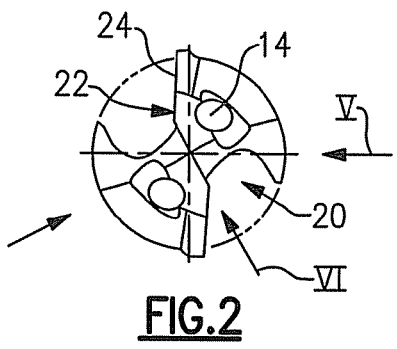
FIG. 2 shows a frontal view in enlarged scale of the tool according to FIG. 1.

As may be inferred in detail from FIG. 2 and FIG. 3, a further secondary flank surface 46, 48 adjoins each of the main flank surfaces 42, 44. The clearance angles WF46 and WF48 are again essentially of equal size, but are approximately 20° in this case.

Finally, the drill according to the invention is also distinguished by a special feature with respect to the coolant/lubricant supply. The discharge openings designated by the reference numerals 14 of the cooling ducts in the drill webs are freely ground toward the respective taper surfaces 36 (see FIG. 8 in particular). For this purpose, preferably using the outer periphery of a rounded grinding disc, grinding is performed in the drill tip at an angle WE of 21°, for example, to a radial plane ER encompassing the secondary cutting edge, so that—as is best obvious from FIG. 2, FIG. 3, FIG. 6, and FIG. 8—a duct section results which expands somewhat starting from the discharge opening 14 toward the taper surface 36. The width BKA of the duct section is preferably slightly greater than the diameter of the internal cooling ducts 14, and the depth TKA corresponds to approximately half of the diameter of the internal cooling ducts.

The drill according to the invention may also be produced using machine tools which are restricted to simple kinematic movements with respect to their equipment. All functional surfaces of the point may be formed as flat surfaces.

Experiments using this drill in the case of machining of high-strength and very tough metal cast materials have shown that the cutting edge is loaded very uniformly and accordingly has a long service life. In addition, the buckle in the cutting edge has a positive influence on the chip formation in such a manner that short chips arise, via which—with the aid of MQL lubrication technology—the heat is effectively dissipated from the tool.

Variants of the drill according to the invention are described hereafter with reference to FIGS. 9 to 13, which are suitable in particular for the machining of very tough materials, such as cast steel, quenched and tempered steel, or other steel materials which are difficult to machine, but also for the machining of metal cast materials, such as cast iron, including GGV or ADI cast iron.

In these embodiments, components and details which correspond to the components of the above-described embodiment are provided with similar reference numerals, which are prefixed by "1" or "2", however.

Figure 9:
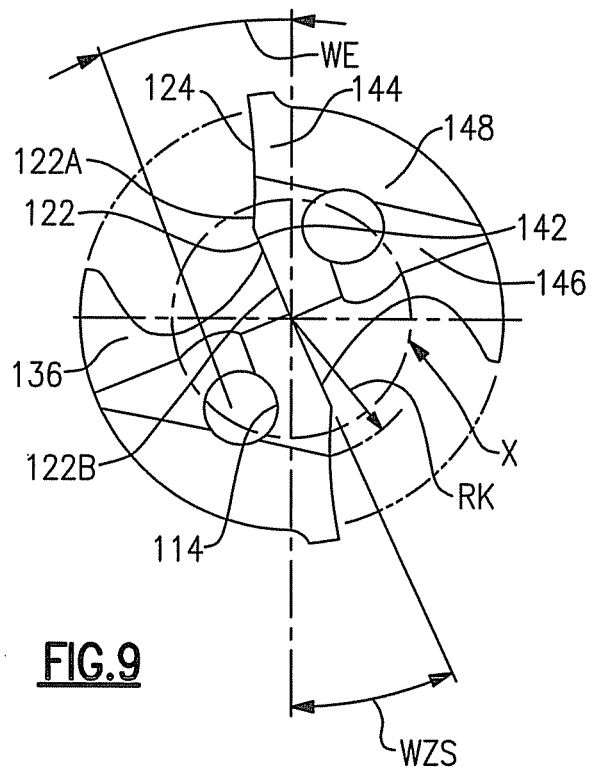
FIG. 9 shows a view corresponding to FIG. 3 of a further embodiment of the tool.
Figure 10:
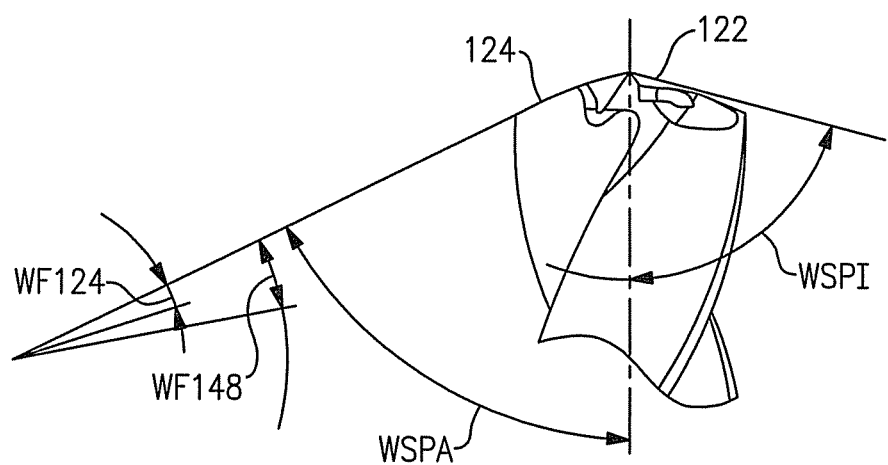
FIG. 10 shows a view corresponding to FIG. 5 of the tool from FIG. 9.
Figure 11:
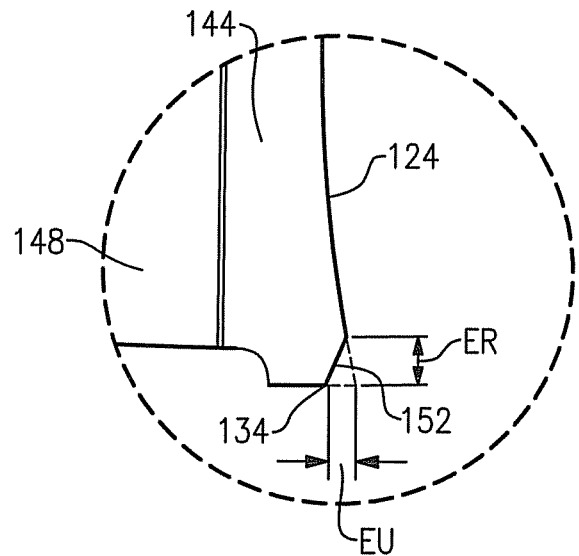
FIG. 11 shows detail "XI" in FIG. 9.

The drill 110 shown in FIGS. 9 to 11 fundamentally corresponds to the drill 10 with respect to the construction and the cutting edge geometry. The course of the main cutting edge, the design of the cutting edge corner, and the tip angle are different.

The drill 110 is again ground in such a way that the main cutting edge has at least two main cutting edge sections 122 and 124, which each define different angles WSPI and WSPA. Specifically (see FIG. 10), the radial inner main cutting edge section 122 defines the tip angle WSPI, which is preferably in the range between 130 and 150°, particularly preferably approximately 140°. In contrast, the radial outer main cutting edge section 124 establishes a tip angle WSPA, which is again smaller than the angle WSPI and is preferably in the range between 95 and 130°, more preferably approximately 125°. Reference can be made to the description of FIGS. 2 to 8 on the details with respect to the point (flank surfaces, chisel edge, taper), to avoid repetitions. The main cutting edge is again corrected by the taper 136 in this embodiment.

As is thus obvious from FIG. 11, in further contrast to the first embodiment, the main cutting edge runs slightly concavely at least in the area of the radial outer main cutting edge section 124, preferably so that positive radial chip angles do not result anywhere on the entire length of the main cutting edge.

Furthermore, the cutting edge corner 134 is recessed by the amount EU in the peripheral direction, which is performed by applying a chamfer 152 on the radial outer main cutting edge section 124. The chamfer 152 has an extension (ER) in the radial direction, which is in the range between 0.05 and 0.07× D, and an extension in the peripheral direction EU, which is in the range between 0.025 and 0.035×D, D designating the nominal diameter of the drill (10).

Extensive drilling experiments using the following parameters were performed using this tool having a diameter of 7.7 mm with variation of the tip angle WSPA for the radial outer main cutting edge section at unchanged inner tip angle of 140°:
material: solid carbide SC
cutting speed: 120 m/minute
speed: 4960 rpm
advance speed: 992 mm/minute
drilling depth: 38 mm
cooling: internal cooling MQL
cooling lubricant: emulsion 8%
pressure/volume: 48.5 bar/13.4 L/minute Drilling was performed in a plate made of 42CrMo4 having a strength of 1000 N/mm$^2$ and the service life Lf of the tool was monitored. Tool fracture or limiting wear on the main cutting edge sections of 360 μm were established as the criterion for the termination of the experiment.

As a result, it was shown that the best service lives Lf (in meters) between 90 and 110 resulted at an outer tip angle WSPA in the range between 115 and 125°, the best evening out of the wear being displayed at angle range is around 125°. However, service life values Lf of greater than 50 can be achieved even using tip angle values in the limiting ranges of 95° or 130°.

Although the experiments were performed using an SC tool, the experimental results permit the reasonable conclusion that the tool geometry according to the invention also results in substantially improved service lives when high-speed steel, such as HSS or HSS-E, is used as the material.

A further special advantage results if carbides are used. The double tip angle of the drill having a tip angle in the center in the range of approximately 140° and a tip angle in the area adjoining the cutting edge corner in the range of greater than 95° allows extremely good material yield during the production of the point from a carbide blank. The tool is cost-effectively producible in this way even if extremely expensive carbides, such as ultrafine grain carbide or cermet materials are used.

Figure 12:
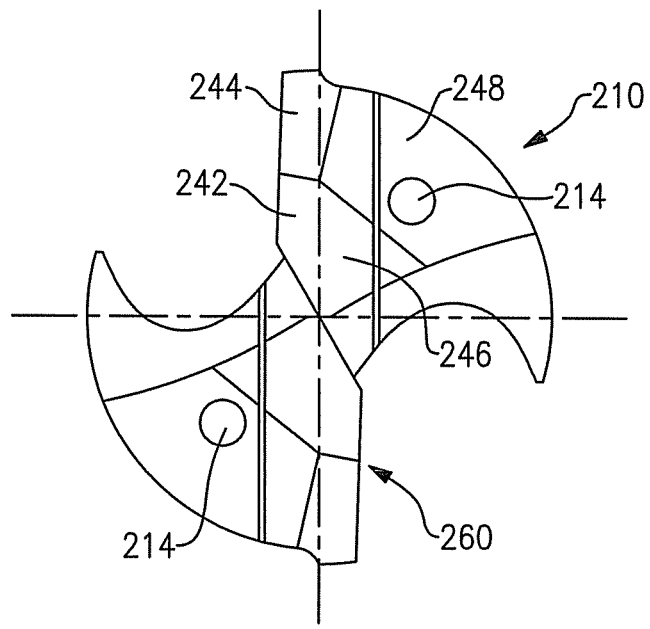
FIG. 12 shows a view corresponding to FIG. 9 of a further embodiment of the tool.

A further alteration of the tool is described with reference to FIG. 12. This tool corresponds to the above-described exemplary embodiments with respect to the point. The special feature is that all sections of the tool 210 which participate in the machining are formed on a cutting edge insert plate 260, which is received, for example, removably fastened, in a diametric recess in the cutting edge insert holder. This design allows only the cutting edge insert plate to be formed from high-strength material, such as high-speed steel or carbide, whereby the tool can also be used cost-effectively for processing larger diameters. The internal cooling ducts 214 are to be offset somewhat in this embodiment, so that the discharge openings are not covered by the cutting edge insert plate. In a further alteration from the above-described embodiments, the discharges of the internal cooling ducts 214 are not ground free.

Figure 13:
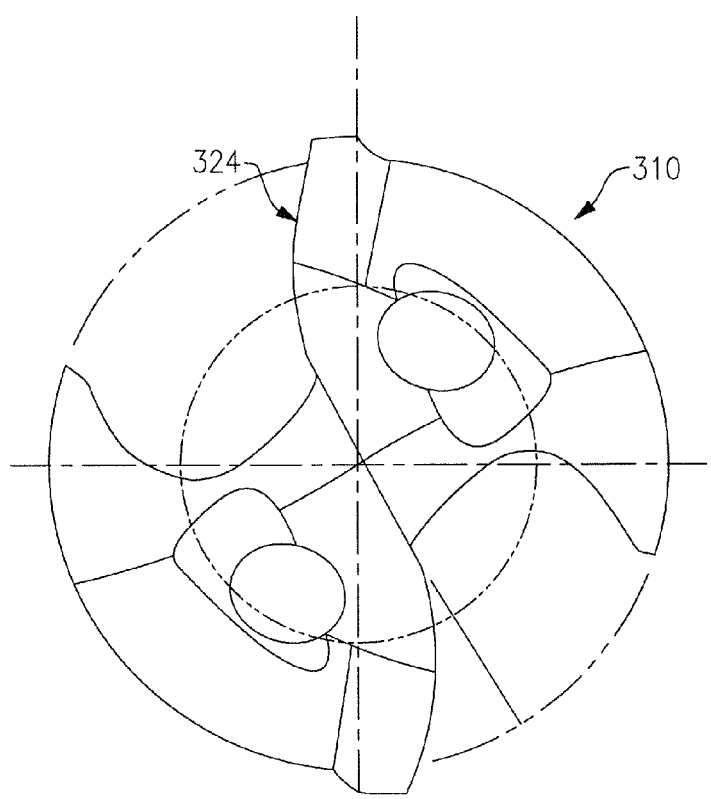
FIG. 13 shows a view corresponding to FIG. 3 of a further embodiment of the tool.

FIG. 13 illustrates a drill 310, fundamentally corresponding to the drill 10, and having an outer radial main cutting edge section 324 that runs convexly viewed in the axial direction.

Of course, deviations from the exemplary embodiment shown are also possible without leaving the basic idea of the invention. For example, more than two different tip angles may also be ground, the angles becoming smaller and smaller from the inside to the outside.

More than two main cutting edges may also be provided. The type of the taper is also not restricted to a split point according to DIN 1412 Form C. Other tapers with and without corrected main cutting edge may also be used. The taper surfaces may also be formed by slightly curved surfaces.

The tool can also be constructed from multiple parts, the shank and the predominant part of the cutting edge part being produced from a tool steel such as HSS or HSS-E and the tool being able to be equipped with a cutting edge insert made of a carbide.

The invention thus provides a multiple edge drill, which is suitable in particular for processing materials which are difficult to machine, e.g., very tough materials, such as cast steel, quenched and tempered steel, and other steel materials which are difficult to machine, including metal cast materials, such as cast iron, and in particular GGV or ADI cast iron. The point is designed so that the main cutting edge has at least two main cutting edge sections, which define tip angles of different sizes. The radial outer tip angle is smaller than the radial inner tip angle, whereby good machining behavior may be achieved with a long service life of the tool.

The invention claimed is:

1. A multiple edge drill comprising:
a point; and
a main cutting edge having at least two main cutting edge sections and a buckle point,
the at least two main cutting edge sections comprising a radial outer main cutting edge section and a radial inner main cutting edge section, the radial outer main cutting-edge section defining a radial outer tip angle, the radial inner main cutting edge section defining a radial inner tip angle, the radial outer tip angle being smaller than the radial inner tip angle,
the radial outer tip angle in the range between 95 and 130°, the radial inner tip angle in the range between 130 and 150°,
the buckle point lying between the two main cutting edge sections and having a distance from the drill axis in the range greater than 0.25 and up to 0.35×D, D designating the nominal diameter of the drill.

2. The drill according to claim 1, wherein the radial inner main cutting edge section comprises a first area and a second area, the second area running at a second area/first area angle to the first area toward a center of the drill in the axial direction viewed from a tip of the drill.

3. The drill according to claim 2, wherein the second area/first area angle is rounded and has a rounding radius, the rounding radius being in the range between 0.2 and 0.26×D.

4. The drill according to claim 2, wherein the second area angled to the first area toward the center of the drill is formed by a taper.

5. The drill according to claim 1, wherein the drill further comprises a first main flank surface and a second main flank surface, the first main flank surface assigned to the radial inner main cutting edge section, the second main flank surface assigned to the radial outer main cutting edge section, respective clearance angles individually establishable via the first main flank surface and the second main flank surface.

6. The drill according to claim 5, wherein the first main flank surface and the second main flank surface are each formed by a first surface and a second surface, the first surface being adjacent to the main cutting edge section, the first surface defining a smaller clearance angle than the second surface.

7. The drill according to claim 1, wherein at least the radial outer main cutting edge section runs convexly viewed in the axial direction.

8. The drill according to claim 1, wherein at least the radial outer main cutting edge section runs concavely viewed in the axial direction.

9. The drill according to claim 1, wherein the drill further comprises a main flank surface and internal coolant/lubricant ducts, the coolant/lubricant ducts exiting in the main flank surface.

10. The drill according to claim 9, wherein respective discharge openings of the internal coolant/lubricant ducts to flutes of the drill are freely ground.

11. The drill according to claim 1, wherein the tool further comprises a cutting edge corner, and the radial outer main cutting edge section has a chamfer in the area of the cutting edge corner, the cutting edge corner having an extension in the radial direction is in the range between 0.05 and 0.07×D and an extension in the peripheral direction in the range between 0.025 and 0.035×D.

12. The drill according to claim 1, wherein the drill comprises spiral flutes.

13. The drill according to claim 1, wherein the drill at least partially comprises high-speed steel.

14. The drill according to claim 1, wherein the drill is implemented as a carbide tool, at least in an area of the main cutting edge.

15. The drill according to claim 13, wherein the drill comprises a fine-grained carbide at least in the area close to the main cutting edge.

16. The drill according to claim 1, wherein the main cutting edge of the drill is formed by a cutting-edge insert, the cutting-edge insert comprising a high-strength material or a carbide.

17. A method comprising contacting a very tough material with a drill according to claim 1.

18. A drill according to claim 6, wherein the drill further comprises a taper surface, the taper surface directly adjacent to the second surface of the first main flank surface and the second surface of the second main flank surface.

* * * * *

UNITED STATES PATENT AND TRADEMARK OFFICE
CERTIFICATE OF CORRECTION

PATENT NO. : 9,004,825 B2
APPLICATION NO. : 12/979594
DATED : April 14, 2015
INVENTOR(S) : Jochen Gruber It is certified that error appears in the above-identified patent and that said Letters Patent is hereby corrected as shown below:

In the Claims

Claim 11, Col. 10, Line 28

Please change: "the radial direction is in the range between 0.05 and 0.07×D" to -- the radial direction in the range between 0.05 and 0.07×D --

Signed and Sealed this
Eighth Day of September, 2015

Michelle K. Lee
*Director of the United States Patent and Trademark Office*